United States Patent

Ohmori et al.

[11] 4,280,740
[45] Jul. 28, 1981

[54] SKID PREVENTION METHOD AND AN ANTI-SKID BRAKE DEVICE

[75] Inventors: Taiji Ohmori; Yoshikazu Tsuchiya, both of Kawagoe; Makoto Sato, Kamifukuoka; Yoshitaka Miyakawa, Kawagoe; Etsuo Fujii, Wako, all of Japan

[73] Assignee: Honda Giken Kogyo Kabushiki Kaisha, Tokyo, Japan

[21] Appl. No.: 26,991

[22] Filed: Apr. 4, 1979

[30] Foreign Application Priority Data

Apr. 6, 1978 [JP] Japan .................................. 53-40688

[51] Int. Cl.³ .............................................. B60T 8/00
[52] U.S. Cl. ...................................... 303/92; 303/119
[58] Field of Search ................ 303/92, 119, 105, 106, 303/108, 110; 244/194; 307/219

[56] References Cited

U.S. PATENT DOCUMENTS

| | | | |
|---|---|---|---|
| 3,614,401 | 10/1971 | Lode ................................ | 244/194 X |
| 3,744,851 | 7/1973 | Burckhardt et al. ............... | 303/92 X |
| 3,920,280 | 11/1975 | Luhdorff et al. ...................... | 303/92 |
| 4,059,312 | 11/1977 | Jonner ................................. | 303/92 |

*Primary Examiner*—J. D. Miller
*Assistant Examiner*—Reinhard J. Eisenzopf
*Attorney, Agent, or Firm*—Haseltine & Lake

[57] ABSTRACT

A skid prevention method for reducing braking torque during a wheel lock while braking, using a main control system of an anti-skid brake device regardless of the brake input by the driver. When wheel lock is overcome, reduction of braking torque ceases. When wheel lock lasts more than a preset period without reduction in breaking torque, even when wheel lock results from failure of the main control system, the braking torque is reduced for a preset period through an auxiliary system. If the main control system reduces the braking torque for a period longer than a preset time, braking torque reduction by the main control system may be nullified, and when wheel lock lasts longer than a preset period, the braking torque may be reduced by the auxiliary control system for the preset period. An anti-skid device for carrying out this method has a brake for applying the braking torque to the wheels, a main control system for controlling the brake to reduce braking torque in case of wheel lock. An auxiliary control system replaces the main control system in case of failure of the latter; this auxiliary system has a circuit for detecting wheel lock, and circuit actuated when the wheel lock detector circuit is actuated for more than a preset period.

3 Claims, 10 Drawing Figures

SKID PREVENTION METHOD AND AN ANTI-SKID BRAKE DEVICE

BACKGROUND OF THE INVENTION

The present invention relates to a skid prevention method and an anti-skid brake device for embodying the method in which brake devices of wheels may be controlled by control devices provided with main control systems and an auxiliary control system adapted to be actuated when main control systems fail.

A vehicular anti-skid brake device is such that when a possibility of a lock of a wheel occurs as a result of an excessive braking input based on the braking operation of a driver, the braking device is controlled so as to decrease the braking torque irrespective of the braking input based on the braking operation of the driver to thereby prevent the lock of the wheel and secure the directional stability and steerability of the vehicle, and in addition, shorten the braking distance, offering an action which can enhance the safety of the vehicle.

However, since the anti-skid brake device is a device which controls the braking torque of wheels irrespective of the braking input based on the braking operation of the driver, when a failure occurs with the anti-skid brake device being in operation, there is a possibility of fully ineffective braking, and in the event the anti-skid brake device becomes entirely inoperative as a result of a failure thereof, it is likely to cause the wheels to be locked by the braking operation of the driver who places full confidence in the anti-skid brake device. In either case, it is very dangerous.

Generally, it is possible, when the anti-skid brake device has failed, to give a driver an alarm about the failure and to secure the normal braking function of the braking device. However, in the event the anti-skid brake device has failed immediately before the braking or during the braking, it is hardly possible for the driver to cope therewith quickly and adequately even if such an alarm should be given to him, and the vehicle will lose its directional stability to get into danger, resulting in a serious accident. Moreover, there has not been a method or apparatus for sufficiently preventing such a dangerous situation.

SUMMARY OF THE INVENTION

The present invention provides a skid prevention method and an anti-skid brake device, wherein a braking device of wheels is controlled by a control device provided with main control systems and an auxiliary control system which actuates when the main control systems fail, whereby even if the main control systems should fail, a measure of anti-skid function could be assured through the auxiliary control system at least until such a failure is recognized by the driver and remedied adequately by the driver.

BRIEF DESCRIPTION OF THE DRAWINGS

FIG. 6 is a view showing the association of FIGS. 6(a) and 6(b), in which FIG. 6(a) shows a control logical circuit for actuating the oil pressure control device in FIG. 1.

DESCRIPTION OF THE PREFERRED EMBODIMENTS

Figure 1:
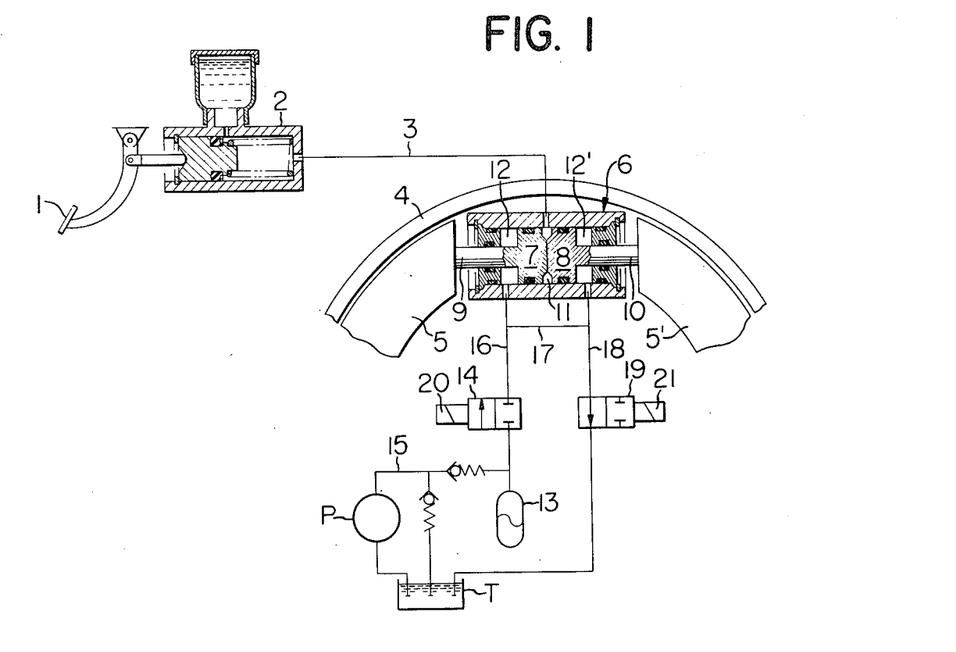
FIG. 1 is a conceptual view with a principal portion sectioned showing a braking device of wheels and an oil pressure control device for controlling a braking torque of the braking device.

Referring first to FIG. 1, a brake pedal 1 is operatively connected to a master cylinder 2, such that a braking hydraulic pressure is generated in the master cylinder 2 as the brake pedal 1 is depressed by the driver's foot. The master cylinder 2 is connected, through a passage 3, to a braking oil chamber 11 formed between a pair of opposing pistons 7, 8 disposed in a wheel cylinder 6 which in turn is mounted on the body of an automobile. The pistons 7, 8 have respective piston rods 9, 10 which extend outwardly through the end walls of the wheel cylinder 6. These piston rods 9, 10 are connected at their outer ends to the respective one of a pair of brake shoes 5, 5' which are adapted to exert a braking torque upon frictional contact with a brake drum 4.

The arrangement is such that, when the brake pedal 1 is depressed, the master cylinder 1 generates the braking hydraulic pressure which is transmitted through the passage 3 to the braking oil chamber 11, so as to press and move the pistons 7, 8 away from each other. As a result, the brake shoes 5, 5' are pressed against the frictional surfaces of the brake drum 4, so as to cooperate with the latter to exert a braking torque on the wheel.

If the braking hydraulic pressure in the braking oil chamber 11 is too high, the braking torque produced by the cooperation of the brake shoes 5, 5' and the brake drum 4 becomes excessively large, so that the wheel is locked dangerously. In order to avoid this danger, a pair of control oil chambers 12, 12' are formed between the pistons 7, 8 and corresponding end walls of the wheel cylinder 6. When the pressure in the braking oil chamber 11 has been raised to such a level as to incur a danger or possibility of a wheel lock, the oil pressure in the control oil chambers 12, 12' is suitably controlled to suppress the movement of the pistons 7, 8 caused by the braking hydraulic pressure.

The controlling oil pressure in the control oil chambers 12, 12' is controlled by a controller having the following construction and function.

The control oil sucked from a tank T by means of a pump P and then pressurized is delivered, through a passage 15 and an accumulator 13, to the inlet port of an inlet valve 14 which is adapted to be switched by a solenoid coil 20. The outlet port of the inlet valve 14 is connected through a passage 16 to a control oil chamber 12 and further to the control oil chamber 12' through a passage 17. The control oil chamber 12 is connected through passages 16, 17 and 18 to the inlet port of an outlet valve 19 which is adapted to be switched by a solenoid coil 21. The control oil chamber 12' is also connected to the inlet port of the same outlet valve 19 through the passage 18. The outlet port of the outlet valve 19 is in communication with the oil tank T.

The inlet valve 14 is normally held at a leftwardly biased position as viewed in FIG. 1. In this state, the control oil chambers 12, 12' are disconnected from the pump P and the accumulator 13. As the solenoid coil is energized upon receipt of a signal, the inlet valve 14 is switched to assume the left-hand side position as viewed in FIG. 1, so that the control oil discharged from the pump P is delivered to the control oil chambers 12, 12' through the accumulator 13 and the inlet valve 14, so as to bias the pistons 7, 8 toward each other, against the braking hydraulic pressure in the braking hydraulic chamber 11.

The outlet valve 19 is normally held at a rightwardly biased position as viewed in FIG. 1. In this state, the control oil chambers 12, 12' are opened to the tank T via the outlet valve 19. As the solenoid coil 21 is energized by a signal delivered thereto, the outlet valve 19 is switched to assume the leftwardly biased position as viewed in FIG. 1, so that the control oil chambers 12, 12' are disconnected from the tank T.

In a first state of operation in which the inlet valve 14 and the outlet valve 19 have been switched to take the right and left-hand side positions, respectively, i.e. the state in which current is delivered neither to the solenoid coil 20 nor to the solenoid coil 21, the pistons 7, 8 are pressurized and moved solely by the braking hydraulic pressure in the braking oil chamber 11, because the control oil chambers 12, 12' are opened into the tank T. As a result, the braking torque increases freely in accordance with the braking operation made by the driver.

In a second state of operation in which the outlet valve 19 has been switched to take the right-hand side position, i.e. the state in which current is delivered to the solenoid coil 21 to energize the latter, the control oil chambers 12, 12' are disconnected from the tank T, so that the control oil in the control oil chambers 12, 12' is blocked. Therefore, the pistons 7, 8 are prevented from moving further, even if the braking oil pressure in the braking oil chamber 11 is increased. Consequently, the braking torque is maintained constant, irrespective of the braking operation made by the driver. This second state of operation is adopted when there is a possibility of a lock of the wheel.

In a third state of operation in which the inlet valve 14 and the outlet valve 19 have been switched to assume the left and right positions, respectively, i.e. in the state in which both of the solenoid coils 20, 21 are in receipt of current, the control oil discharged from the pump P is forcibly fed into the control oil chambers 12, 12' through the accumulator 13 and the inlet valve 14. Since the control oil chambers 12, 12' in this state are isolated from the tank T, the pistons 7, 8 are moved toward each other, overcoming the braking hydraulic pressure in the braking oil chamber 11. As a result, the braking torque is decreased irrespective of the braking operation of the driver. This third state of operation is adopted when the wheel is in danger of locking, i.e. when the possibility of lock of the wheel is greater.

Figure 2:
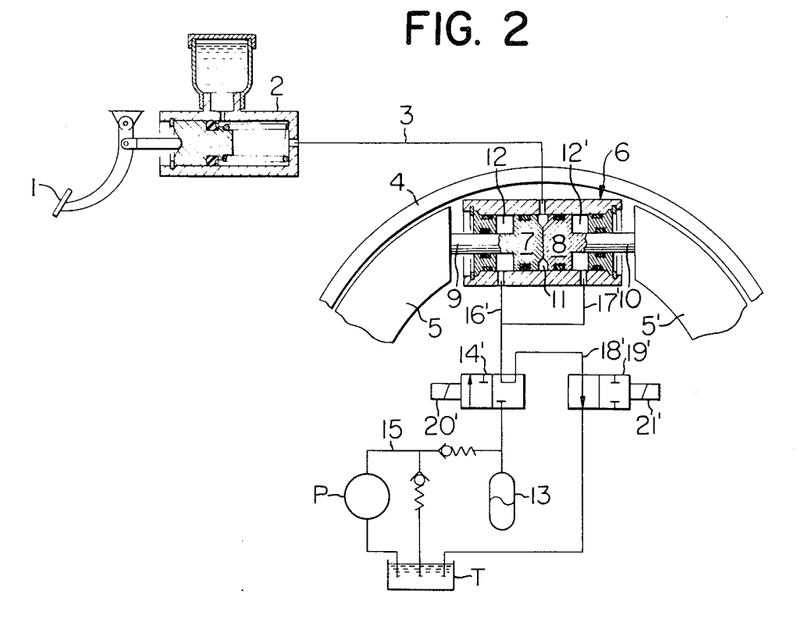
FIG. 2 is a conceptual view with a principal portion sectioned of the device similar to that of FIG. 1 having an oil passage construction different from that shown in FIG. 1.

FIG. 2 shows a modified form of the braking system, as depicted in FIG. 1, including a different hydraulic circuit arrangement. In this modification, an inlet valve 14' is actuated by a solenoid coil 20' and an outlet valve 19' is actuated by a solenoid coil 21'. A pair of control oil chambers 12, 12' are in fluid communication with a first outlet port of an inlet valve 14' by way of passages 16', 17', with a second outlet port of the inlet valve 14' being in fluid communication with an outlet port of an outlet valve 19' by way of a passage 18'. The construction of the remaining parts of this braking system is identical with that of FIG. 1 and thus the corresponding portions of FIG. 2 are indicated by the same reference numerals as those used in FIG. 1.

In this modification, when the solenoid coils 20', 21' are supplied with no current, the respective control oil chambers 12, 12' are opened to the oil tank T and the braking system is in the same operating condition as the first state of operation in the FIG. 1 embodiment so that the brake torque during braking application can be increased freely in accordance with the driver's braking effort. In case the solenoid coil 21' is supplied with current, the outlet valve 19' is changed to the right-side position to disconnect the respective control oil chambers 12, 12' from the oil tank T, i.e., the brake system assuming the same operating condition as the second state of operation in the FIG. 1 embodiment, so that the braking torque is held in a constant level irrespective of the braking effort of the driver. Further, when the solenoid coils 20', 21' are supplied with current, the inlet valve 14' is shifted to the left-side position and at the same time the outlet valve 14' is shifted to the left-side position to permit pressure oil discharged from the pump P to enter the respective control oil chamber 12, 12' via accumulator 13 and inlet valve 14'. On this occasion, the control oil chambers 12, 12' are both disconnected from the tank T and the braking system is brought into the same operating condition as the third state of operation in the FIG. 1 embodiment so that the brake torque is reduced independently of the driver's braking operation. In this manner, the braking system of FIG. 2 is essentially identical in mode of operation with that of FIG. 1 and hence in the following, will be described in association with only the braking system as shown in FIG. 1.

In order to find the rate of slip of the wheel, it is necessary to estimate the speed of the automobile. A practical example of detecting unit or means 32 for detecting the speed of the automobile will be described hereinafter with reference to FIGS. 3 and 6.

Figure 3:
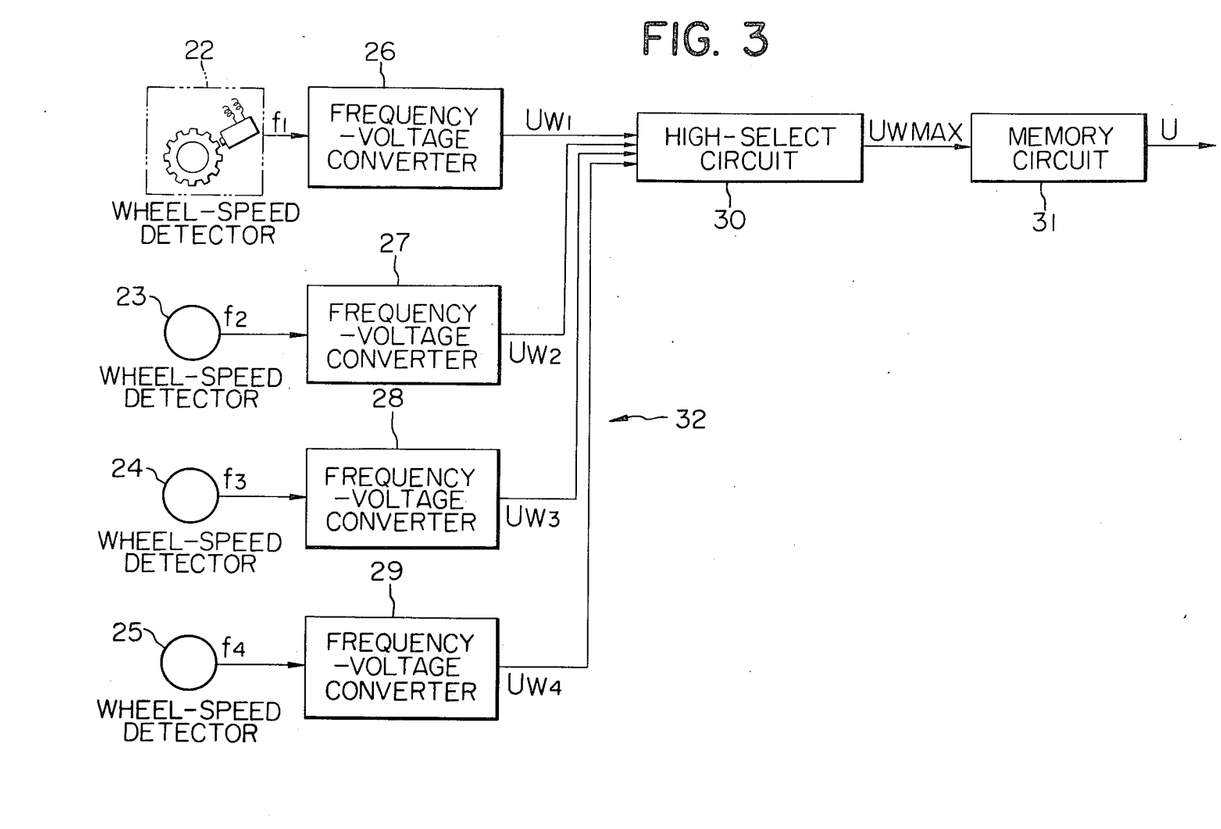
FIG. 3 is a block diagram showing one example of a vehicle-speed estimating device.
Figure 5:
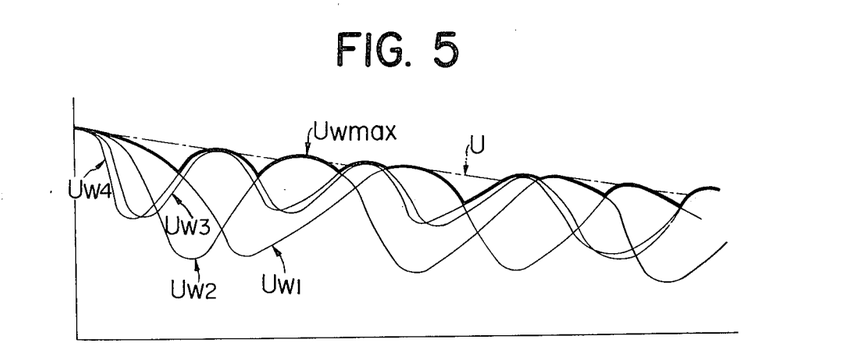
FIG. 5 is a graphic representation for explanation of one example of the operation of the vehicle-speed estimating device in FIG. 3.

Referring first to FIG. 3, the wheels are provided with respective wheel-speed detectors 22, 23, 24 and 25 adapted to detect the peripheral speeds of respective wheels. More specifically, these wheel-speed detectors are adapted to produce and deliver wheel speed signals in the form of frequency signals $f_1$, $f_2$, $f_3$ and $f_4$ in proportion to the peripheral speed of corresponding wheels. These frequency signals $f_1$, $f_2$, $f_3$ and $f_4$ are in proportion to the peripheral speeds of corresponding wheels. These frequency signals $f_1$, $f_2$, $f_3$ and $f_4$ representing the peripheral speeds of respective wheels are then delivered to frequency converters 26, 27, 28 and 29, where they are converted into voltage signals Uw1, Uw2, Uw3 and Uw4 which are easier to handle. These voltage signals are in proportion to the peripheral speeds of respective wheels. FIG. 5 shows how the voltage signals Uw1, Uw2, Uw3 and Uw4 representative of the speeds of respective wheels are changed in relation to the time elapsed, when the anti-skid device is functioning.

Referring again to FIG. 3, the wheel-spaced voltage signals Uw1, Uw2, Uw3 and Uw4, which are the output from respective frequency-voltage converters, are then delivered to a high-select circuit 30. The high-select circuit 30 is adapted to select the wheel-speed voltage signal having the highest level of all wheelspeed voltage signals Uw1, Uw2, Uw3, Uw4 and produces the maximum wheel-speed voltage signal Uwmax as the output, as shown by thick line in FIG. 5.

The maximum wheel-speed voltage signal Uwmax produced by the high select circuit 30 is then delivered to a memory circuit 31 which has a constant current-discharging characteristic corresponding to a standard or reference deceleration during the braking. The memory circuit 31 produces, upon receipt of the maximum wheel-speed voltage signal Uwmax, an estimated-vehicle voltage signal U which is an attenuating signal having a gradient determined by the discharging characteristics of the memory circuit 31, as shown by a envelope line in FIG. 5.

Figure 4:
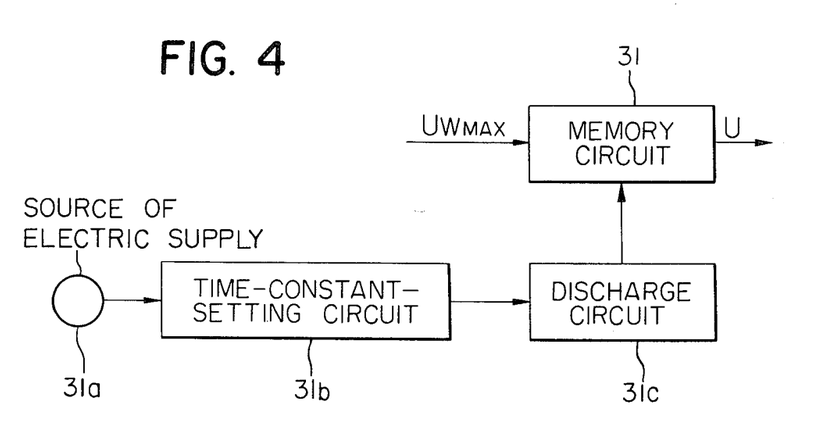
FIG. 4 is a block diagram showing a principal portion of the device for controlling the operation of a memory circuit in FIG. 3.

FIG. 4 illustrates one example of means for setting the discharging characteristic of the memory circuit 31. In this example, an output signal from a time-constant-setting circuit 31b, connected to a source of electric supply 31a, is sent to a discharge circuit 31c and an output signal from the discharge circuit 31c is in turn fed to the memory circuit 31 so that the memory circuit 31 can exhibit a predetermined discharging characteristic.

Figures 6, 6A:
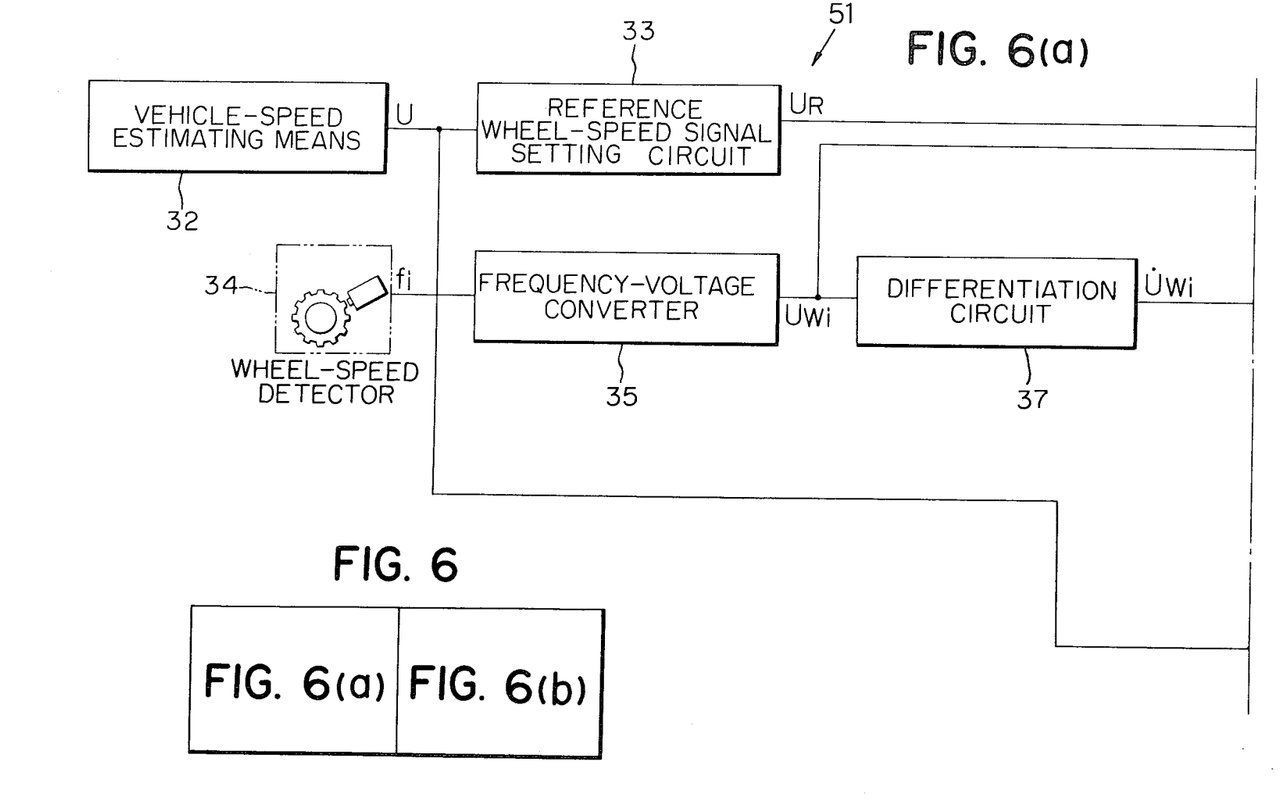
Figure 6B:
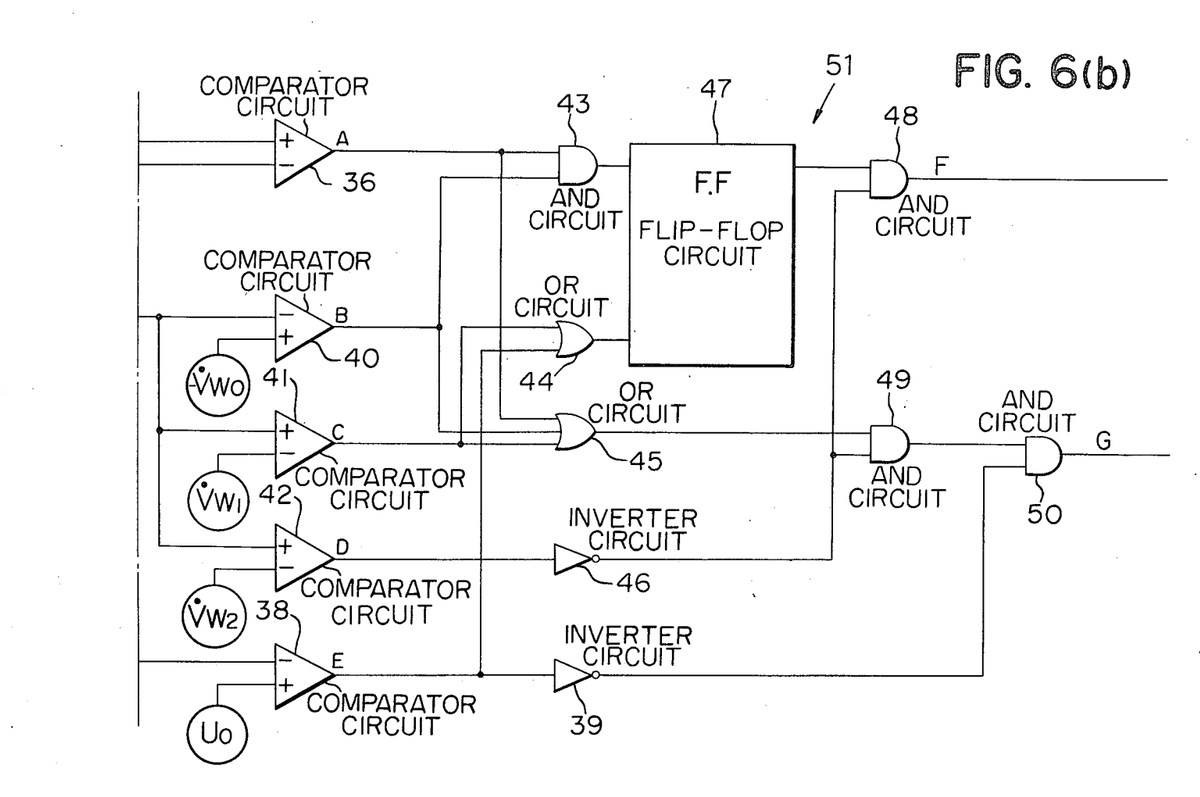
FIG. 6(b) shows the other half portion thereof.

FIGS. 6(a) and 6(b) show one example of a control logical circuit 51, in which the vehicle-speed voltage signal U as estimated by the vehicle-velocity estimating means 32 is delivered to the reference wheel-speed-signal setting circuit 33 and also to the comparator circuit 38. The reference wheel-speed-signal setting circuit 33 consists of a division circuit and is adapted to set such a reference wheel-speed as to cause a predetermined slip rate $\lambda_o$ for the estimated vehicle-speed-voltage signal U. More specifically, this circuit 33 sets a reference wheel-speed voltage signal $U_R$ given by the following equation, and delivers it to the comparator circuit 36.

$$U_R = (1 - \lambda_o)U$$

The peripheral speed of the wheel, the braking torque of which is controlled, is detected by the wheel-speed detector 34 annexed to the wheel. The wheel-speed detector 34 produces, as its output, a wheel-speed frequency signal fi proportional to the peripheral velocity of the wheel. This frequency signal is directly converted into a wheel-speed voltage signal Uwi proportional to the peripheral velocity of the wheel, by means of the frequency voltage converter 35.

In order to obtain this wheel-speed voltage signal Uwi for each wheel, the wheel-speed detectors 22, 23, 24, 25 and frequency-voltage converters 26, 27, 28, 29, constituting the vehicle-speed estimating means 32 as shown in FIG. 3, may be used as the wheel-speed detectors 34 and the frequency-voltage converters 35 for respective wheels.

The wheel-speed voltage signal Uwi is then transmitted to the comparator circuit 36 and the differentiation circuit 37. The differentiation circuit 37 differentiates the wheel-speed voltage signal Uwi and produces a wheel-acceleration voltage signal Üwi as its output. This wheel-acceleration voltage signal Üwi is directly delivered to comparator circuits 40, 41 and 42. The comparator circuit 36 is adapted to compare the wheel-speed voltage signal Uwi with the reference-wheel voltage signal $U_R$, and produces its output, only when the level of the wheel-speed voltage signal Uwi is smaller than that of the reference wheel-speed voltage signal $U_R$, and delivers its output A to an AND circuit 43 and an OR circuit 45.

The comparator circuit 40 compares the wheel-acceleration voltage signal Üwi with a previously set reference wheel-deceleration voltage signal -V̇wo which represents a predetermined negative reference acceleration. This comparator circuit 40 produces its output B only when the level of the wheel-acceleration voltage signal Üwi is smaller than that of the reference wheel-deceleration voltage signal -V̇wo, and delivers the output B to the AND circuit 43 and the OR circuit 45.

The comparator circuit 41 is adapted to compare the wheel-acceleration voltage signal uwi with a first reference wheel-acceleration voltage signal V̇w1 which represents a previously set positive reference acceleration, and produces its output only when the level of the wheel-acceleration voltage signal Uwi is greater than the level of the first reference wheel-acceleration signal V̇w1. The output C of this circuit is delivered to the OR circuits 44 and 45.

The comparator circuit 42 is adapted to compare the wheel-acceleration voltage signal Üwi with a previously set second reference wheel-acceleration voltage signal V̇w2 of a level higher than the first reference wheel-acceleration voltage signal V̇w1, and produces an output D only when the level of the wheel-acceleration voltage signal Üwi is higher than the level of the second reference wheel-acceleration voltage signal V̇w2. The signal D is delivered to an invertor circuit 46.

The comparator circuit 38 is adapted to compare the estimated-vehicle-speed voltage signal U with a previously set low reference vehicle-speed voltage signal Uo, and produces its output E only when the level of the estimated-vehicle-speed voltage signal U is smaller than the level of the low reference vehicle-speed voltage signal Uo. The output E is delivered to the OR circuit 44 and the inverter circuit 39.

The output from the AND circuit 43 and the OR circuit 44 are delivered to a flip-flop circuit 47. The output from the flip-flop circuit 47 in turn is delivered to an AND circuit 48. The output from the OR circuit 45 is delivered to an AND circuit 49, while the output from the inverter circuit 46 is delivered to the AND circuit 48 and another AND circuit 49. The output from the inverter circuit 39 is delivered to an AND circuit 50.

In this connection, it is to be noted that output signals F and G respectively from the AND circuits 48 and 50 cooperate with each other to control the operation of the solenoid coil 20 and 21 in a manner such that the solenoid coils 20, 21 are not energized when the AND circuit 48 produces output F; the solenoid coil 21 alone is energized when the AND circuit 50 produces its output signal g; and the solenoid coils 20, 21 are both energized when the AND circuits 48 and 50 produce outputs F and G.

In the control logical circuit 51 as shown in FIGS. 6(a) and 6(b), the low reference vehicle-speed voltage signal Uo represents such a lower threshold vehicle speed as not to require the anti-skid operation. Therefore, when the estimated-vehicle-speed voltage signal U is smaller than the low reference vechicle-speed voltage signal Vo, the output E delivered by the comparator circuit 38 is inverted by the inverter circuit 39 on its way to the AND circuit 50, so that no current is delivered to the solenoid coil 21. Consequently, the braking torque can be increased freely in accordance with the braking operation made by the driver.

In contrast to the above, when the estimated-vehicle-speed voltage signal U is greater than the low reference vehicle-speed voltage signal Uo, the inverter circuit 39 delivers its output to the AND circuit 50, although the comparator circuit 38 does not produce its output.

It is assumed here that a braking torque is applied to a wheel when the level of the estimated-vehicle-speed voltage signal U is greater than that of the low reference vehicle-speed voltage signal Uo. Since the deceleration of wheel is commenced simultaneously with the application of the braking torque, at least the comparators 41, 42 do not produce their outputs, so that the output from the inverter circuit 46 is delivered to the AND circuits 48 and 49. Then, as the level of the vehicle-speed voltage signal Uwi has come down below the level of the reference wheel-speed voltage signal $U_R$, while the level of the wheel-acceleration voltage signal Üwi comes down below the level of the reference wheel-deceleration voltage signal-$\dot{V}$wo, the comparator circuits 36 and 40 produce their outputs A and B, so that the AND circuit 43 comes to produce its output to make the flip-flop circuit 47 commence the delivery of its output. The flip-flop circuit 47 continues to produce its output until a next new signal is delivered thereto. As long as the flip-flop circuit 47 delivers its output, the AND circuits 48, 49 and 50 continue to produce their outputs, so that both of the solenoid coils 20, 21 are energized. Thus, it is judged that there is a possibility of lock of wheel, and the braking torque is decreased irrespective of the braking operation made by the driver.

As the braking torque is decreased, the speed of wheel is gradually increased to make the level of the wheel-acceleration voltage signal Üwi become greater than the level of the first reference wheel-acceleration voltage signal $\dot{V}$w1, beyond the level of the reference wheel-deceleration voltage signal $-\dot{V}$wo. In this state, the comparator circuit 41 produces its output C and delivers it to the OR circuits 44 and 45. The flip-flop circuit 47, which has produced its output, stops producing the output due to a receipt of a signal from the OR circuit 44.

Meanwhile, provided that the level of the estimated-vehicle-speed voltage signal U has come down below the level of the low reference vehicle-speed voltage signal Uo, the comparator circuit 38 produces its output E to cause the OR circuit 44 to produce the output. The flip-flop circuit 47 stops producing the output, by the recipt of the output from the OR circuit 44. In this state, neither of the AND circuits 48 and 50 produces the output, so that both of the solenoid coils 20, 21 do not receive any current.

On the other hand, if the flip-flop circuit 47 has stopped producing its output by the receipt of the signal C from the comparator circuit 41, while the level of the estimated-vehicle-speed voltage signal U is still maintained higher than that of the low reference vehicle-speed voltage signal Uo, the AND circuit 48 does not produce any output and, accordingly, the solenoid coils 20, 21 receives no signal. Although the AND circuit 50 produces output signal G, the reduction of the braking torque is ceased at this instant.

Then, as the level of the wheel-acceleration voltage signal Üwi is further increased beyond the level of the second reference wheel-speed voltage signal $\dot{V}$w2, the comparator circuit 42 produces an output D. The AND circuits 48, 49 stop producing their outputs, because the signal D' is inverted by the inversion circuit 46. As a result, the delivery of current to the solenoid coils 20, 21 is stopped to allow a free increase of the braking torque in accordance with the braking effort made by the driver.

Figure 7:
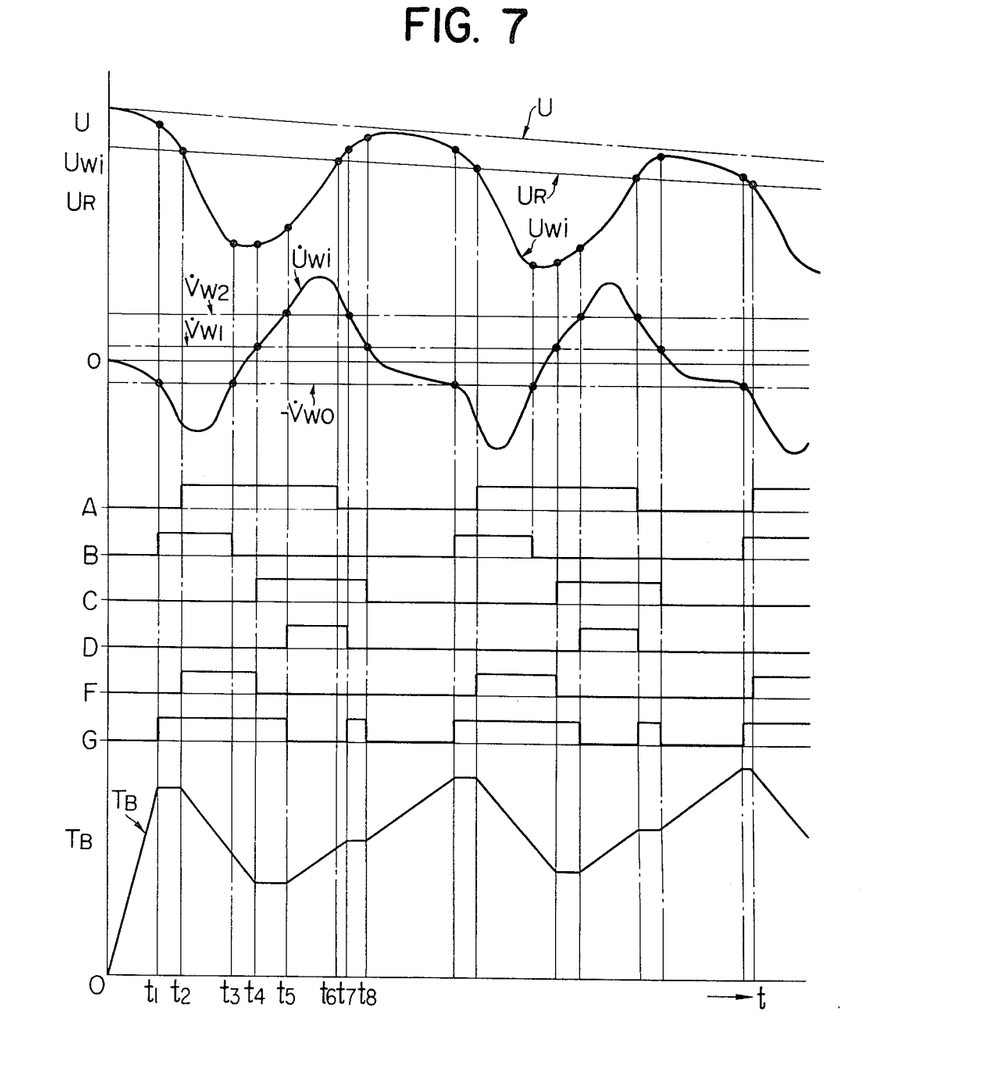
FIG. 7 is an explanatory view showing the operational modes of the braking device and oil pressure control device in FIG. 1 and the signal-processing circuit and logical circuit in FIG. 6, respectively.

FIG. 7 shows, by way of example, the manner of operation of an anti-skid device incorporating a controlling logical circuit as shown in FIG. 6. In FIG. 7, the abscissa represents the time elapsed. The ordinate shows, from the top to bottom, the estimated-vehicle-speed voltage signal U, reference wheel-speed voltage signal $U_R$, wheel-speed voltage signal Uwi and then the reference wheel-deceleration voltage signal $-\dot{V}$wo, first reference wheel-acceleration voltage signal $\dot{V}$w1, second reference wheel-acceleration voltage signal $\dot{V}$w2 and the wheel-acceleration voltage signal Üwi, and further down to the bottom, the output A of the comparator circuit 36, output B from the comparator circuit 40, output C from the comparator circuit 41, output D from the comparator circuit 42, signal F from the AND circuit 48, signal G from the AND circuit 50 and the braking torque $T_B$.

At an instant immediately after the start of the braking, the braking torque $T_B$ is increased gradually and, accordingly, the levels of the wheel-speed voltage signal Uwi and the wheel-acceleration voltage signal Üwi are decreased.

As the level of the wheel-acceleration voltage signal Üwi comes down below the level of the reference wheel-deleration voltage signal $-\dot{V}$wo at an instant t1, the comparator circuit 40 comes to produce its output B, so that the signal G is delivered to maintain the braking torque $T_B$ substantially constant.

In this state, however, the braking torque $T_B$ has become excessively large, due to a time lag of response of the oil pressure control system of a similar reason, so that the level of the wheel-speed voltage signal Uwi continues to decrease further, and comes down below the level of the reference wheel-speed voltage signal $U_R$ at an instant t2. In this state, the comparator cireiuit 36 produces its output A, so that the signal is delivered from the AND circuit 48 to decrease the braking torque $T_B$.

The acceleration of the wheel is increased in accordance with the decrease of the braking torque $T_B$ and, at an instant t3, the level of the wheel-acceleration voltage signal Üwi grows larger than the level of the reference wheel-deceleration voltage signal $-\dot{V}$wo, so that the comparator circuit 40 stops producing its output. However, the delivery of the signal F from the AND circuit 48, is continued due to the action of the flip-flop circuit 47.

At an instant t4, the level of the wheel-acceleration voltage signal Üwi comes to exceed the level of th first reference wheel-acceleration voltage signal $\dot{V}$w1. Then, the comparator circuit 41 produces its output C, so as to make the flip-flop circuit 47 stop the delivery of its output. Consequently, the delivery of the signal F from the AND circuit 48 is stopped, so that the braking torque $T_B$ is maintained materially constant.

In this state, the braking torque has become excessively low, because of a time lag of response of the oil pressure control system of a similar reason. Therefore, the level of the wheel-acceleration voltage signal Üwi as well as the level of the wheel-speed voltage signal Uwi continues to increase, and at an instant t5, the level of the wheel-acceleration voltage signal Üwi is increased beyond the level of the second reference acceleration voltage signal $\dot{V}w2$, so as to allow the comparator circuit 42 to produce its output D. As a result, the delivery of the signal to energize the solenoid coils 20, 21, is stopped to allow the braking torque $T_B$ to increase. Then, at an instant t6, the level of the wheel-speed voltage signal Uwi comes to exceed the level of the reference wheel-speed voltage signal $U_R$, so that the comparator circuit 36 stops producing its output A.

The level of the wheel-acceleration voltage signal $\dot{U}wi$ is gradually lowered as the braking torque $T_B$ is increased and, at an instant t7, comes down below the level of the second reference wheel-acceleration voltage signal $\dot{V}w2$. In this state, the comparator circuit 42 stops producing its output D, so that a signal G is delivered from the AND circuit 50 to maintain the braking torque $T_B$ substantially constant.

Then, as the level of the wheel-acceleration voltage signal $\dot{U}wi$ comes down below the level of the first reference wheel-acceleration voltage signal $\dot{V}w1$, at an instant t8, the comparator circuit 41 stops producing its output C, so that the delivery of the signal G from the AND circuit 50 is stopped to allow the braking torque $T_B$ to increase.

The above-stated operation of the oil pressure control system is repeated to lower the vehicle speed, without incurring any lock of the wheel.

Figure 8:
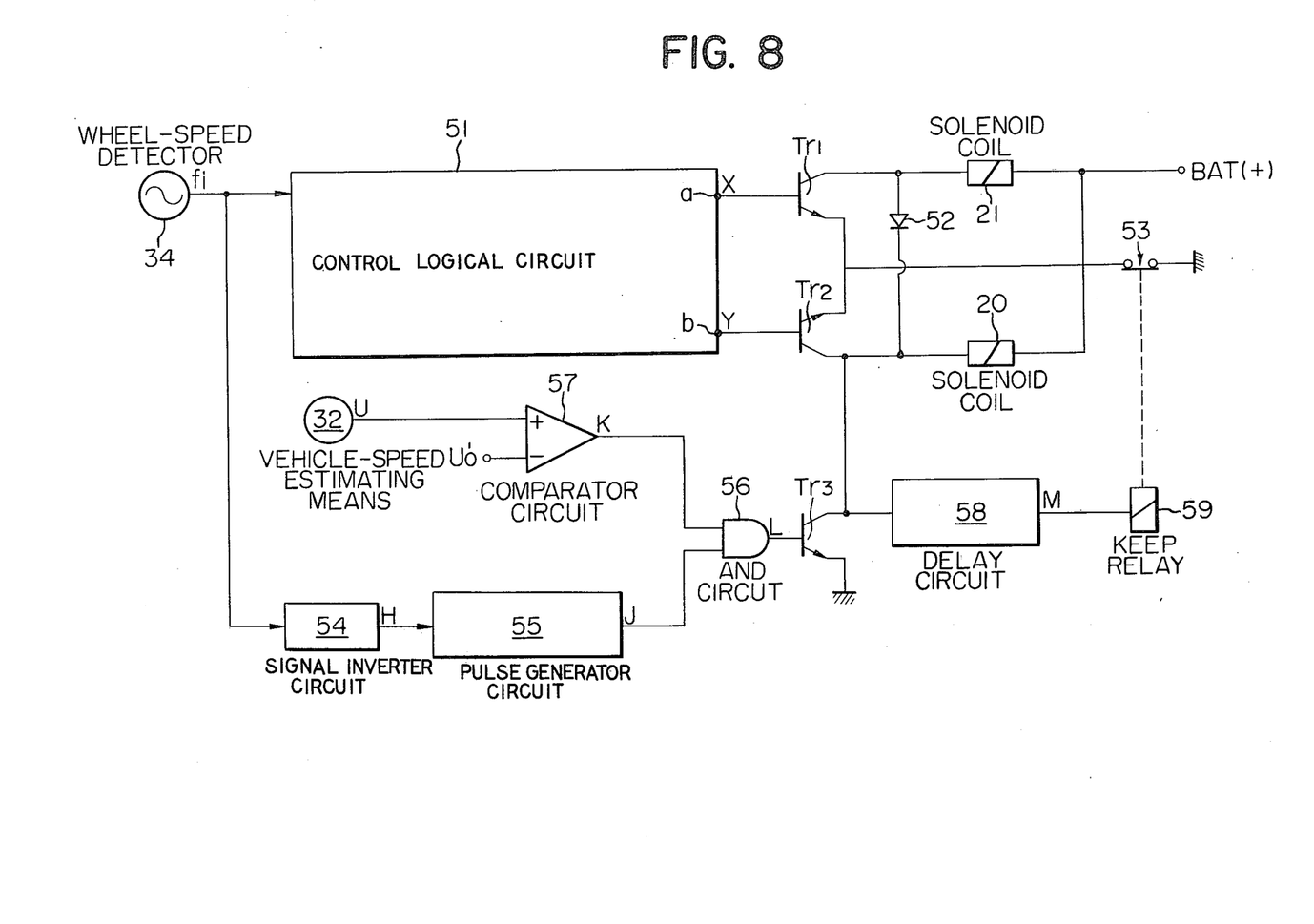
FIG. 8 is a block diagram showing a principal portion of a control device having main control systems and an auxiliary control system.

One example of the control circuit of the anti-skid brake device incorporating the control logical circuit 51 as shown in FIG. 6 in the main control system is shown in FIG. 8. First, the main control system will be explained. The control logical circuit 51 receives, as an input signal, a wheel-speed frequency signal fi from the wheel-speed detector 34 and produces, as its output signal, a signal X from a contact a and a signal Y from a contact b. The signal X is produced when only the AND circuit 50 in FIG. 6 (b) produces an output signal G, and the signal Y is produced when both AND circuit 48 and AND circuit 50 in FIG. 6(b) produce output signals F and G, respectively. The detailed construction and function of other portions of the control logical circuit 51 are as described in connection with FIG. 6.

The contact a is connected to the base of a transistor $Tr_1$ and the contact b is connected to the base of a transistor $Tr_2$. The transistor $Tr_1$ has a collector connected to an anode source BAT(+) through the solenoid coil 21, and the transistor $Tr_2$ has a collector similarly connected to the anode source BAT(+) through the solenoid coil 20. The collector of the transistor $Tr_1$ is further connected to the collector of the transistor $Tr_2$ through a diode 52, and emitters of the transistors $Tr_1$ and $Tr_2$ are grounded through a normally-closed contact 53.

Accordingly, when the signal X is delivered, only the solenoid coil 21 is energized so that in FIG. 1, the outlet valve 19 is switched to the right to thereby hold the braking torque constant, whereas when the signal Y is delivered, both solenoid coils 20 and 21 are energized so that in FIG. 1, the inlet valve 14 is switched to the left and the outlet valve 19 is switched to the right, whereby decreasing the braking torque.

Next, the auxiliary control system will be described. A first circuit or signal converter circuit 54 connected to the output of the wheel-speed detector 34 produces an output signal H during the time when the wheel-speed detector 34 does not produce the output signal fi, and delivers the output signal H to a second circuit or pulse generator circuit 55. The circuit 55, which is a pulse generator including a delay circuit, is designed so as to produce a pulse signal J having a predetermined time $\tau 2$ when the signal H is delivered continuously for a period more than a predetermined fixed time $\tau 1$. The circuit 55 has the output connected to an AND circuit 56 connected to the base of a transistor $Tr_3$. It may also be designed so that the circuit 54 can receive the output signal fi of the wheel-speed detector 34 after said output signal has been converted into a voltage signal, instead of directly receiving it.

The AND circuit 56 is further connected to the output of a comparator circuit 57, which is in turn connected to the output of the vehicle-velocity estimating unit or means 32, and the comparator circuit 57 produces an output signal K when the value of the estimated-vehicle-speed voltage signal U as the output signal of the vehicle-velocity estimating means 32 is greater than the value of the low reference vehicle-speed voltage signal Uo' and delivers it to the AND circuit 56. Upon receipt of the signals J and K, the AND circuit 56 produces the output signal L to place the transistor $Tr_3$ in the conductive state.

The collector of the transistor $Tr_3$ is connected to the collector of the transistor $Tr_2$ and also to a delay circuit 58, which in turn connected to a keep relay 59 adapted to actuate the normally-closed contact 53. The delay circuit 58 produces a signal M when the transistor $Tr_2$ or $Tr_3$ is placed in the conductive state continuously for a period in excess of a predetermined time $\tau 3$, and the keep relay 59 actuates immediately upon receipt of the signal M to place the normally-closed contact 53 in open state and thereafter maintains the contact 53 open even upon extinction of the signal M.

With this arrangement, where the vehicle is running in the state in which the value of the estimated-vehicle-speed voltage signal U is greater than the value of the low reference vehicle-speed voltage signal Uo', if the main control system including the control logical circuit 51 and transistors $Tr_1$ and $Tr_2$ has no failure, the comparator circuit 57 produces the output signal K but the wheel will never be locked continuously for a period more than a predetermined time $\tau 1$. Accordingly, the circuit 55 does not at all produce the output signal and thus the AND circuit 56 produces no output signal so that the transistor $Tr_3$ remains in its cut off state. At that time, the transistor $Tr_2$ is never placed in conductive state continuously for a period in excess of a predetermined time $\tau 3$ and thus the delay circuit 58 never produces the output signal, and as a result, the keep relay 59 is not actuated to maintain the normally-closed contact 53 in the closed state. Therefore, the anti-skid brake device normally performs its anti-skid function through the main control system.

Where the vehicle is running in the state in which the value of the estimated-vehicle-speed voltage signal U is greater than the value of the low reference vehicle-speed voltage signal Uo', when the vehicle remains locked for a period in excess of a predetermined time $\tau 1$ without decreasing the braking torque even if there occurs a possibility of a lock of the wheel resulting from a failure of the main control system, the circuit 54 produces the output signal H continuously for a period in excess of a predetermined time $\tau 1$ so that the circuit 55 produces the output signal J for a period of a predetermined time $\tau 2$, and the AND circuit 56 then produces the output signal L to place the transistor $Tr_3$ in the conductive state. As a result, both the solenoid coils 20 and 21 are energized for a period of predetermined time $\tau_2$ so that the braking torque decreases by the predetermined time $\tau_2$ irrespective of the braking input based on the braking operation of the driver. When the braking torque decreases, the rotational speed of the wheels restores and the output signal H of the circuit 54 extinguishes. However, the main control system fails and hence, even if the rotational speed of the wheels is restored, the braking torque again increases later, as a consequence of which the wheels assumes into a locked state. Again, the circuit 55 produces the signal J. Thereafter, a similar procedure is repeated and the braking device is controlled through the auxiliary control system.

Where the vehicle is running in the state in which the value of the estimated-vehicle-speed voltage signal U is greater than the value of the low reference vehicle-speed voltage signal Uo', when the state in which the main control system acts on the braking device so as to decrease the braking torque resulting from a failure of the main control system continues for a period in excess of a predetermined time $\tau_3$, the delay circuit 58 produces the output signal M because the transistor $Tr_2$ is placed in the conductive state for a period more than a predetermined time $\tau_3$, and the keep relay 59 then actuates to place the normally-closed contact 53 in the open state. As a result, the transistors $Tr_1$ and $Tr_2$ are brought into the non-conductive state, which state is the same as the case where the main control system fails, so that when the locked state of the wheels continues for a period in excess of a predetermined time $\tau_1$ without decreasing the braking torque even if a possibility of a lock of the wheels occurs, the circuits 54 and 55 produce the output signals H and J, respectively and the braking device is controlled so as to decrease the braking torque by the predetermined time $\tau_2$ through the auxiliary control system.

Where the vehicle is running in the state in which the value of the estimated-vehicle-speed voltage signal U is smaller than the value of the low reference vehicle-speed voltage signal Uo', the vehicle speed is very low so that there hardly occurs a possibility of a lock of the wheels even with respect to the braking torque of magnitude whatever. This eliminates the necessity of particular skid-prevention. At this time, the comparator circuit 57 produce no output signal, and even if the main control system should fail, the circuits 54 and 55 would not produce output signals, thus not causing the transistor $Tr_3$ to be conductive.

It should be noted in FIG. 2 that when the inlet valve 14' is switched to the left, the braking torque decreases, and when switching to the right, the braking torque freely increases; for this reason, when the control system in FIG. 8 is applied to the control device in FIG. 2, it is possible to use a solenoid coil 20' in place of the solenoid coil 20 to omit the transistor $Tr_1$, solenoid coil 21 and diode 52. In this case, the current capacity of the transistor $Tr_3$ can be made smaller.

As described above, in the present invention in controlling the braking device of the wheels by the control device provided with the main control system and the auxiliary control system which actuates when the main control system fails, when the locked state of the wheels continues for a period in excess of a predetermined time without decreasing the braking torque even if a possibility of a lock of the wheel occurs, the braking torque can be decreased by the predetermined time through the auxiliary control system. With this, even if the main control system should fail, it is possible to control the braking device in a state similar to the control by means of the main control system later. In addition, according to another invention, where the state in which the main control system acts on the braking device so as to decrease the braking torque continues for a period in excess of the predetermined time, when the operation by means of the main control system is nullified and the locked state of the wheels continues for a period in excess of a predetermined time during the running of the vehicle, the braking device is controlled so as to decrease the braking torque by the predetermined time. With this, the auxiliary control system may act for the main control system and perform its function to cope with a versatile failure thereof. Either invention may provide a skid prevention method or anti-skid brake device, to assure the safety of the vehicle, which can secure an anti-skid function through the auxiliary control system until a failure of the main control system is recognized by the driver and may be treated adequately by the driver.

What is claimed is:

1. An anti-skid brake device comprising: brake means for imparting a brake torque to wheels in response to a driver's braking action; a wheel speed detector for detecting the rotational speed of the wheels; a main control system connected to said wheel speed detector and said brake means, for controlling said brake means such that brake torque is decreased when said wheels are being locked, and increased when the possibility of wheel lock is gone; an auxiliary control system connected to said wheel speed detector and said brake means in parallel relation with said main control system for reducing brake torque for a predetermined period, whenever wheel lock continues longer than a predetermined period due to failure of said main control system and being further defined by a time-constant-setting circuit transmitting an output signal to a discharge circuit, said discharge circuit having an output signal applied to a memory circuit means; a wheel-speed-signal setting circuit comprising a division circuit for setting a reference wheel-speed voltage signal; a comparator means for comparing the wheel speed signal with a reference-wheel voltage signal and solenoid coil means and AND gates connected for controlling operation of said solenoid-coil means.

2. An anti-skid brake device as defined in claim 1 wherein said auxiliary control system further comprises control-system-switching means for nullifying operation of said main control system when said main control system continues to operate longer than a predetermined period; said control-system switching means actuating said auxiliary control system for controlling operation of said brake means.

3. An anti-skid brake device as defined in claim 1, including a plurality of wheel-speed detectors for providing wheel speed signals in form of frequency signals.

* * * * *